United States Patent [19]
Ikeda

[11] Patent Number: 5,475,848
[45] Date of Patent: Dec. 12, 1995

[54] SUPERVISORY CONTROL METHOD AND POWER SAVING CONTROL UNIT FOR COMPUTER SYSTEM

[75] Inventor: Osamu Ikeda, Tokyo, Japan

[73] Assignee: Dia Semicon Systems, Incorporated, Tokyo, Japan

[21] Appl. No.: 417,028

[22] Filed: Apr. 5, 1995

Related U.S. Application Data

[60] Division of Ser. No. 886,649, May 20, 1992, Pat. No. 5,430,881, which is a continuation-in-part of Ser. No. 735,382, Jul. 24, 1991, abandoned.

[30] Foreign Application Priority Data

Dec. 28, 1990 [JP] Japan ................................. 2-415567
Dec. 26, 1991 [JP] Japan ................................. 3-345560

[51] Int. Cl.⁶ ............................................. G06F 1/32
[52] U.S. Cl. ................... 395/750; 364/707; 364/273.1; 364/273.2; 364/273.3; 364/259; 364/259.2; 364/DIG. 1
[58] Field of Search .................... 395/750, 425, 395/275; 364/707; 365/226, 227

[56] References Cited

U.S. PATENT DOCUMENTS

| | | | |
|---|---|---|---|
| 3,941,989 | 3/1976 | McLaughlin et al. | 364/707 |
| 4,381,552 | 4/1983 | Nocilini et al. | 364/707 |
| 4,614,883 | 9/1986 | Sood et al. | 326/106 |
| 4,747,041 | 5/1988 | Engel et al. | 395/750 |
| 5,083,266 | 1/1992 | Watanabe | 395/275 |
| 5,129,091 | 7/1992 | Yorimoto | 395/750 |
| 5,218,704 | 6/1993 | Watts, Jr. | 395/750 |
| 5,241,680 | 8/1993 | Cole et al. | 395/750 |
| 5,369,771 | 11/1994 | Gettel | 395/750 |

Primary Examiner—Gopal C. Ray
Attorney, Agent, or Firm—Barnes & Thornburg

[57] ABSTRACT

To reduce the total power consumption of a computer system, a supervisory control method is used to detect a substantial rest state of a CPU wherein it is waiting for a substantial task to start while repeatedly executing a small loop program. The method includes a step addresses accessed by the CPU in a predetermined period of time Ta are stored in proper address blocks, the stored addresses being defined as a learned address, and a step wherein a check is made to see if the CPU accesses an address other than the learned address in a predetermined period of time Tb. When no access of the CPU to any address other than the learned address is detected in the checking step, the both steps are repeated until it is detected in the checking step that an address other than the learned address is accessed by the CPU. In this instance, at least the time Ta is reduced for each repetition of the both steps. Then, it is checked whether or not the CPU accesses to an address other than the learned address in a predetermined period of time Tc which is longer than the time Ta. If not, then it is decided it is highly probable that the CPU is in the substantial rest state.

4 Claims, 8 Drawing Sheets

SUPERVISORY CONTROL METHOD AND POWER SAVING CONTROL UNIT FOR COMPUTER SYSTEM

This is a division of application Ser. No. 07/886,649, filed May 20, 1992, now U.S. Pat. No. 5,430,881 which is a continuation-in-part of application Ser. No. 07/735,382, filed Jul. 24, 1991, now abandoned.

BACKGROUND OF THE INVENTION

1. Field of the Invention

The present invention relates to a supervisory control method and a power saving control unit for a computer system and, more particularly, to a method for detecting, with high probability, the status of the computer system wherein the CPU is waiting for the next substantial task to start while repeatedly executing a small loop program (which status will hereinafter be referred to as a substantial rest state) and a power saving control unit for reducing the power consumption of the CPU in the substantial rest status through utilization of the supervisory control method.

2. Description of the Prior Art

As disclosed in Japanese Patent Laid-Open Publication No. 178818/90, for example, it is well-known in the art to stop power supply to those sections of a computer system which are not executing any substantial tasks so as to reduce the total power consumption, and this technology has been put to practical use in various forms. In the field of battery-driven, portable personal computers including a lap-top computer, in particular, much study is now being given power saving technology of this kind with a view to maximize the system uptime with a smaller and lighter battery.

A certain known personal computer possesses two kinds of standby functions commonly referred to as a rest mode and a sleep mode. The rest mode is a function which automatically switches the clock frequency from 16 MHz to 1 MHz when the CPU does not operate for a predetermined period of time. A certain elapsed time thereafter the computer automatically enters the sleep mode, in which the power supply is stopped. Whichever mode the computer is operating in, it will return to a normal mode upon pressing an arbitrary key. The period of time for which the CPU does not operate before the computer goes into the standby mode can arbitrarily be set by individual users.

Thus, it is a condition for the computer to enter the reduced power consumption status, i.e., the above-mentioned standby mode, that the CPU does not operate for any substantial task for a predetermined period of time. More specifically, the computer assumes the reduced power consumption status when an external factor which starts the CPU for a substantial task, such as an input from the keyboard or communication controller, does not occur for a predetermined period of time.

In the prior art in which the CPU is regarded as being in the substantial rest status when the above-mentioned external factor does not occur for a predetermined period of time, power consumption cannot sufficiently be reduced, because it is necessary to set the "predetermined period of time" to more than tens of seconds for ordinary personal computers.

Now, let it be assumed that a personal computer is operating under Japanese word processing software. In this instance, every input from the keyboard constitutes a factor which activates the CPU. In response to each input signal the CPU performs a very simple task of displaying a character on a display, a little complicated task such as a kana character to kanji character conversion or moving a document, or a little more complicated and hence time-consuming task such as adjustment of files. When an operator keys while elaborating sentence, the processing speed of the CPU is generally far higher than the keying speed of the operator, and in most cases a substantial rest period as short as tens of milliseconds to several seconds occurs between key inputs.

If the aforementioned "predetermined period of time" is set to one to several seconds taking such a substantial rest time into account, then the CPU will go into the power saving mode prematurely before it completes processing in the case of performing a little time-consuming task such as moving a document or adjusting a file. It is therefore necessary to set the "predetermined period of time" to tens of seconds to several minutes, allowing for a sufficient margin for safety. This, however, keeps the power saving function from serving during such short-time substantial rest periods which occur frequently, hence power dissipation cannot sufficiently be reduced.

One possible solution to this problem is to construct the computer system so that each time the CPU enters the substantial rest mode it indicates to an external power saving control circuit that the power saving mode is applicable. Yet this calls for incorporating some additional functions of features into software under which the CPU operates. It is very cumbersome to add such new functions to the existing software. It is a condition of the present invention that no modifications be introduced into the existing software, and the possible solution does not meet this condition.

Furthermore, if the computer system works with only one piece of software, it is possible to pre-analyze the contents of the software to thereby accurately detect the substantial rest state of the CPU wherein the CPU repeatedly executes a small loop program while accessing only a particular address group. It is impractical, however, to take this approach for various pieces of software that the computer system executes.

SUMMARY OF THE INVENTION

It is therefore an object of the present invention to provide a supervisory control method for a computer system by which it is possible to detect, with high probability, the aforementioned substantial rest state of the CPU wherein it is waiting for the initiation of a substantial task while repeating the execution of a small loop program, by supervising or monitoring signals on a system bus of the computer from the outside of the CPU. The method of the present invention is applicable to every piece of software without introducing thereinto any modifications.

Another object of the present invention is to provide a power saving control unit which effectively reduces the power consumption of the CPU through utilization of the above-noted method.

According to a first aspect of the present invention, the supervisory control method for a computer system includes a step A wherein addresses accessed by the CPU in a predetermined period of time Tx are stored in appropriate address blocks (which stored addresses or address blocks will hereinafter be referred to as learned addresses) and a step B wherein a check is made to see if the CPU has accessed addresses other than the learned addresses in a predetermined period of time Ty dependent on the time Tx. The two steps A and B are repeatedly performed while appropriately varying the time intervals Tx and Ty, and a minimum value Tx(min) of the time Tx which introduces a state wherein the CPU does not access any addresses other than the learned addresses in the time Ty is detected with proper resolution through use of a proper algorithm. When the minimum value Tx(min) is detected, it is decided it is highly probable that the CPU is in the substantial rest state wherein it repeatedly executes a small loop program with a period shorter than the above-noted value Tx(min).

According to a second aspect of the present invention, the steps A and B are repeatedly performed while gradually increasing the time intervals Tx and Ty from their lower limit values toward upper limit values, to detect the above-mentioned minimum value Tx(min).

According to a third aspect of the present invention, signals on the system bus are monitored to determine if the CPU is in the substantial rest state through use of the following steps;

(Step 1) Addresses accessed by the CPU in a predetermined period of time Ta are stored in appropriate address blocks. The stored addresses or address blocks will hereinafter be referred to as learned addresses.

(Step 2) A check is made to see if the CPU has accessed addresses other than the learned addresses in a predetermined period of time Tb.

(Step 3) When it is found in step 2 that the CPU has not accessed any addresses other than the learned addresses, Steps 1 and 2 are repeated while properly reducing at least the time Ta until it is detected in Step 2 that the CPU has accessed addresses other than the learned addresses.

(Step 4) When it is detected in Step 2 that the CPU has accessed addresses other than the learned addresses, a check is made to see if the CPU has accessed addresses other than the learned addresses in a predetermined period of time Tc set in accordance with the time Ta and properly longer than it, and if not, then it is decided it is highly probable that the CPU is in the substantial rest state.

According to a fourth aspect of the present invention, a step A wherein addresses accessed by the CPU in a properly predetermined period of time Tx are stored in proper address blocks (which stored addresses or address blocks will hereinafter be referred to as learned addresses) and a step B wherein a check is made to see if the CPU has accessed addresses other than the learned addresses in a properly predetermined period of time Ty are repeatedly performed, and when it is found that the CPU has not accessed any addresses other than the learned addresses in the time Ty, it is decided it is highly probable that the CPU is repeating the execution of a small loop program with a period shorter than the time Tx and hence is in the substantial rest state.

According to a fifth aspect of the present invention, the power saving control unit includes: means a for switching the CPU between a normal mode of ordinary power consumption and a power saving mode of small power consumption; means b whereby addresses accessed by the CPU in a predetermined period of time Tx are stored in proper address blocks (which stored addresses or address blocks will hereinafter be referred to as learned addresses); means c whereby, immediately after the operation of the means b, it is checked whether or not the CPU has accessed addresses other than the learned addresses in a predetermined period of time Ty dependent on the time Tx; means d for causing the means b and c to perform their operation repeatedly while properly varying the time intervals Tx and Ty in the state in which CPU is in the normal mode of operation and for detecting, with proper resolution through use of a proper algorithm, a minimum value Tx(min) of the time Tx which brings about the state in which the CPU does not access any addresses other than the learned addresses; means e for causing the CPU to operate in the power saving mode unless an, exceptional condition is met when the minimum value Tx(min) is detected by the means d; means f for detecting the access of the CPU to an address other than the learned addresses while the CPU is operating in the power saving mode; and means g for switching the CPU to the normal mode when the access of the CPU to the address other than the learned addresses is detected by the means f.

According to a sixth aspect of the present invention, the power saving control unit includes: means a for switching the CPU between a normal mode of ordinary power consumption and a power saving mode of small power consumption; means b whereby addresses accessed by the CPU in a predetermined period of time Tx are stored in proper address blocks (which stored addresses or address blocks will hereinafter be referred to as learned addresses), means c whereby, immediately after the operation of the means b, it is checked whether or not the CPU has accessed addresses other than the learned addresses in a predetermined period of time Ty; means e for causing the means b and c to perform their operation repeatedly in the state in which the CPU is in the normal mode of operation and for putting the CPU in the power saving mode unless an exceptional condition is met when the access of the CPU to an address other than the learned addresses is not detected in the time Ty; means f for detecting the access of the CPU to an address other than the learned addresses when the CPU is operating in the power saving mode; and means g for putting the CPU in the normal mode when its access to an address other than the learned addresses is detected by the means f.

In the case where the computer system executes a loop program of a certain cycle, memory addresses where instructions constituting the loop are stored are fixed for almost all instructions. Hence, when the CPU executes a loop program repeatedly, it accesses only a limited address group repeatedly. Now, let the repetition period of the access be represented by TO. In the methods according to the first and second aspects of the invention, if the aforementioned period of time Tx is shorter than the period TO, the access of the CPU to an address other than the learned addresses is detected in Step B, but if the time Tx is longer than the period TO, the access of the CPU to an address other than the learned addresses is not detected. The aforementioned value Tx(min) is larger than TO but is the smallest possible value. The detection of the value Tx(min) can be construed as indicating that the CPU is repeatedly executing a loop program of a shorter period. With the method according to the second aspect of the invention, the detection of the value Tx(min) is particularly rapid. Incidentally, the time Ty dependent on the time Tx is properly selected in the range of a value a little smaller than Tx to a value several times larger than Tx.

With the power saving control unit according to the fifth aspect of the present invention which embodies the method according to the first aspect of the invention, when the Tx(min) is detected, the CPU enters the power saving mode, and when an address other than the learned addresses is accessed, the CPU returns to the normal mode.

With the method according to the third aspect of the present invention, when the aforementioned time Ta is longer than the aforementioned repetition period TO of a loop program, the access to an address other than the learned addresses is not detected in Step 2. When the time Ta is gradually reduced to be nearly equal to the period TO, the access to an address other than the learned addresses is detected in Step 2. The time Tc is determined in accordance with the time Ta in this instance. Then, if an address other than the learned addresses is not accessed during the time Tc, it is decided it is highly probable that the CPU is in the substantial rest state. Incidentally, an initial value of the time Ta is preset so that it corresponds to a maximum value of the repetition period of a loop program which may put the CPU in the substantial rest state.

With the method according to the fourth aspect of the present invention, the aforementioned time Tx is fixed to a relatively small value and a loop program is detected which is executed repeatedly with a period shorter than the time Tx.

With the control unit according to the sixth aspect of the present invention which embodies the method according to the fourth aspect of the invention, the CPU goes into the power saving mode when its substantial rest state is detected, and the CPU returns to the normal mode when an address other than the learned addresses is accessed.

These and other objects, features and advantages of the invention will become more apparent from the following description taken in connection with the accompanying drawings.

DESCRIPTION OF THE PREFERRED EMBODIMENT

Figure 1:
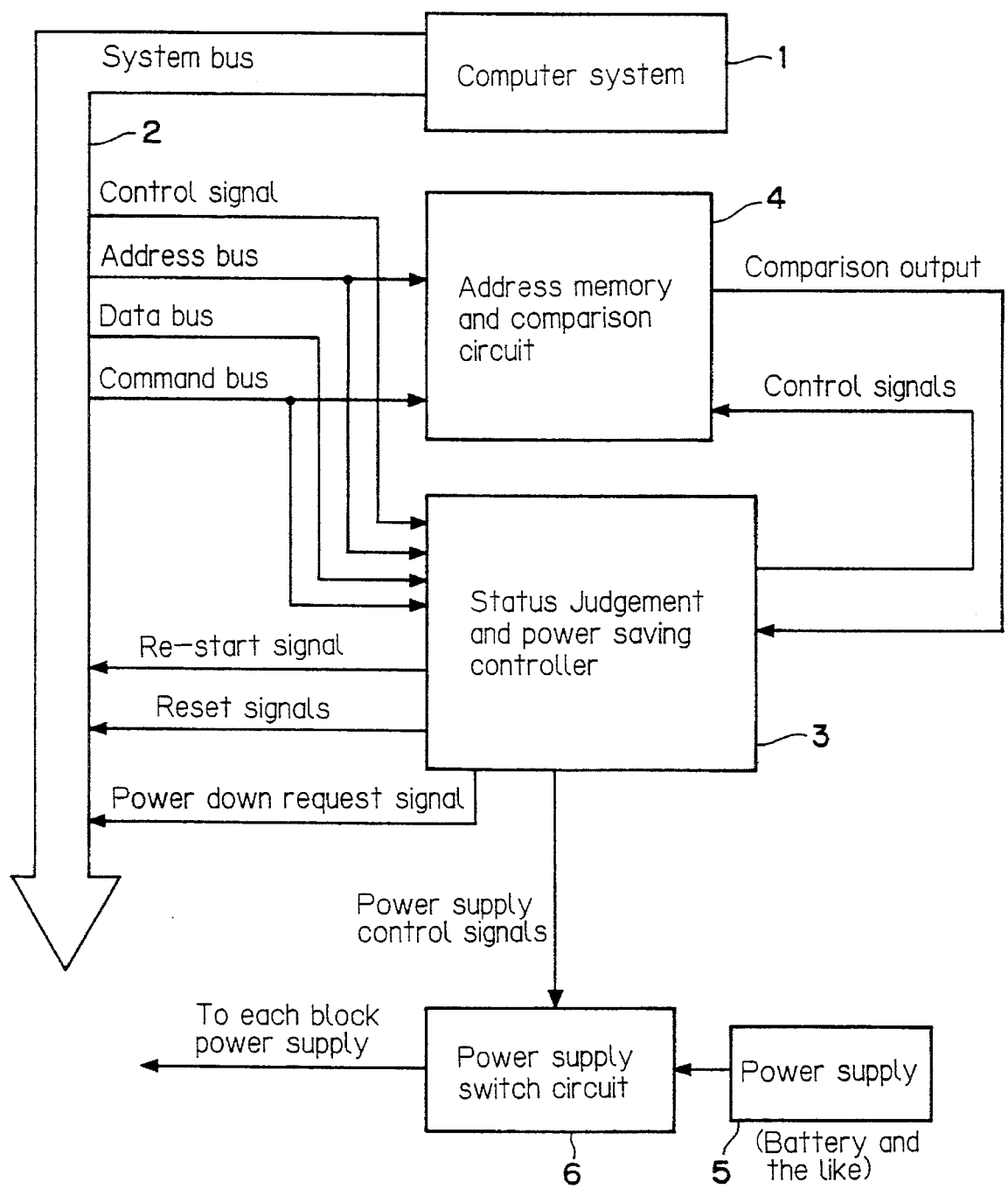
FIG. 1 is a block diagram illustrating the general construction of a computer system equipped with a power saving control unit which embodies the method according to the third aspect of the present invention.

FIG.1 illustrates in block form a computer system equipped with a power saving control unit utilizing the supervisory control method according to the third aspect of the present invention. A status judgement and power saving controller 3 is connected to a system bus 2 of a computer system 1 to be supervised. An address memory and comparison circuit 4, which is placed under control of the controller 3, is connected to an address bus and a command bus. The computer system 1 comprises several functional sections, each of which is supplied with power from a power supply 5 via a power supply switch circuit 6. As described below, the controller 3 determines if the CPU of the computer system 1 is in the substantial rest state and turns on or off the switch circuit 6 accordingly.

Figure 2:
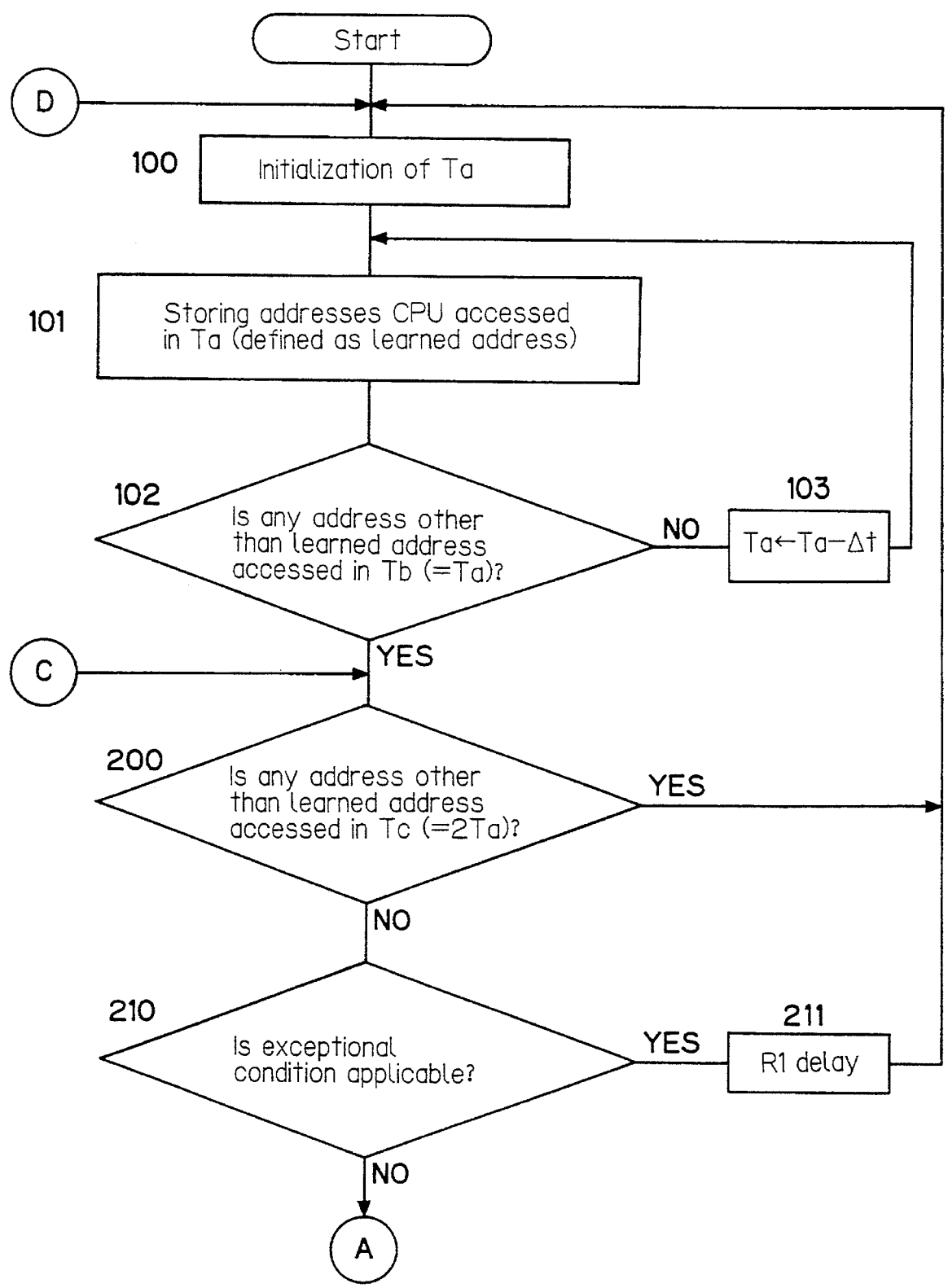
FIGS. 2 through 4 are flowcharts showing the procedures of a status judgement and power saving controller 3 in FIG. 1.
Figure 3:
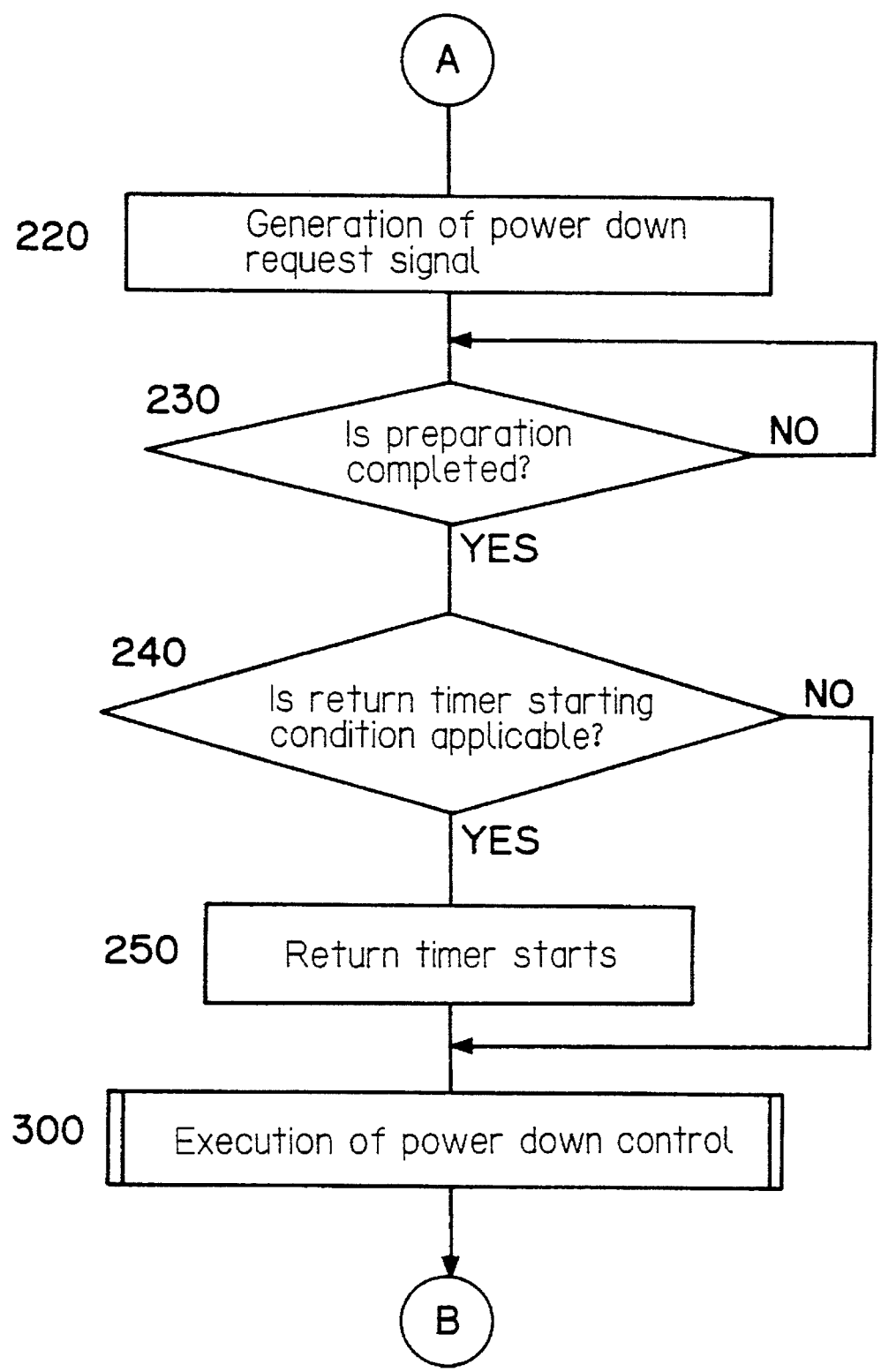
Figure 4:
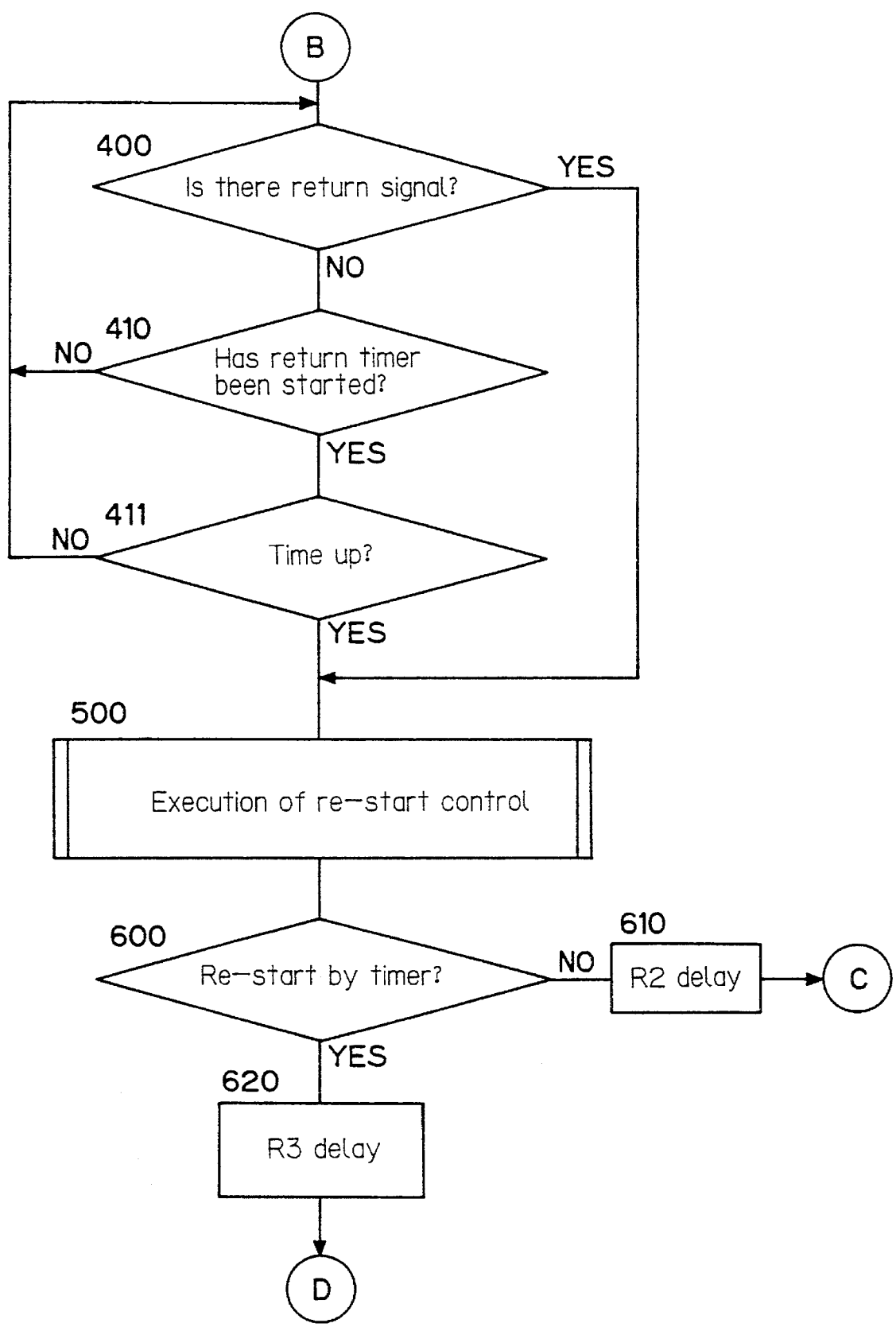

FIGS. 2 through 4 show control steps of the controller 3. In step 101 following an initialization step 100 the address memory and comparison circuit 4 is cleared and is then operated in an address memory mode for only a predetermined period of time Ta. By this, addresses accessed by the CPU during the period Ta are stored in the address memory and comparison circuit 4. The initial value of the time Ta is determined as described below. The address information stored in the address memory and comparison circuit 4 does not necessarily contains every single address accessed by the CPU. The information indicates certain address blocks accessed by the CPU as described later on. The addresses stored in step 101 will hereinafter be referred to as "learned addresses."

Next, the controller 3 proceeds to step 102, wherein the address memory and comparison circuit 4 is operated in an address comparison mode for a certain period of time Tb, which is equal to the above-mentioned time Ta in this example. The address memory and comparison circuit 4 then compares addresses being accessed by the CPU during the period Ta with the learned addresses one after another and, when an address other than the learned addresses is accessed, provides a disagreement signal to the controller 3.

When no address is accessed other than the learned addresses in step 102, that is, no disagreement signal is provided, the controller 3 proceeds to step 103 to reduce the time Ta by δt and then returns to step 101. Consequently, the controller 3 repeatedly executes steps 101 and 102 while reducing the time Ta little by little until the access of the CPU to an address other than the learned addresses is detected in step 102.

The repetition of steps 101, 102 and 103 is a cyclic search and address learning process, by which when the CPU executes a small loop program repeatedly, the time Ta is reduced to become nearly equal to the repetition period TO of the small loop program and addresses accessed by the CPU during the repetition of the small loop program are stored in the address memory and comparison circuit 4. In other words, when the time Ta becomes substantially equal to the period TO, an access of the CPU to an address other than the learned addresses is detected in step 102 and the controller 3 proceeds to step 200.

Step 200 is a status supervising step, wherein it is checked whether or not the CPU accesses an address other than the learned addresses during a period Tc twice longer than the time Ta determined in the cyclic search and address learning process (steps 100, 101, 102, and 103). That is, the address memory and comparison circuit 4 is operated in the address comparison mode for the extended period of time Tc and a check is made to see if the circuit 4 provides a disagreement signal. If the CPU does not execute a small loop program repeatedly, an access to an address other than the learned addresses is detected in step 200, and in this instance, the controller 3 returns to step 100 and initializes the time Ta, thereafter performing again the cyclic search and address learning process (steps 101, 102, and 103).

If the CPU executes a small loop program repeatedly, no access to an address other than the learned addresses is detected in step 200, in which case the procedure goes to step 210. In this way, the repetitive execution of a small loop program by the CPU is detected. In many cases, the CPU executes a small loop program repeatedly when it is in the substantial rest state, that is, when it is waiting for a substantial task to start, but some exceptions to the substantial rest state exist. In step 210 various pieces of internal information of the computer system 1 are used to make a check to determine if an exceptional condition is met, as described later on. When no exceptional condition is met, it is provisionally decided that the CPU is in the substantial rest state, and the controller 3 proceeds to step 220. When an exceptional condition is fulfilled, the procedure goes back to step 100 after a certain time R1 elapsed in step 211. The delay time R1 will also be described later on.

When it is decided that the CPU is in the substantial rest state, the controller 3 proceeds to step 220, wherein the controller 3 provides a power-down request signal to the CPU to urge it to make preparations for a power-down operation, such as saving of necessary data. In step 230 the controller 3 waits for a response from the CPU to the effect that it has completed the preparations for the power-down operation.

Upon receipt of such a response from the CPU the controller 3 makes a check to determine if a condition for activating a return timer, described later on, has been met (step 240), and if so the controller 3 activates the return timer (step 250) and then proceeds to step 300, wherein it controls the power supply switch circuit 6 to stop the power supply to the CPU.

Following this, the controller 3 proceeds to step 400 and makes a check to see if a return signal such as an input signal from the keyboard is generated for starting a substantial task of the CPU. When the return signal is generated., the controller 3 proceeds to step 500, wherein power is supplied to the CPU to restart it. In the case where the controller 3 activated the return timer in step 250, it proceeds from step 410 to 411 and, when the return timer becomes UP, goes to step 500 to restart the CPU, even if no return signal is available. The restart control begins with controlling the switch circuit 6 to supply power to the CPU, followed by applying thereto reset signals and a restart signal.

In step 600 subsequent to the restart control step 500, it is checked whether the restart of the CPU was based on the time-UP of the return timer or the return signal as an input signal from the keyboard or the like. If the CPU was restarted in response to the return signal, the controller 3 goes back to the status supervising step 200 after a certain time R2 elapsed in step 610. Where the CPU was restarted by the return timer, the controller 3 goes back to step 100 to reexecute the cyclic search and address learning process (steps 101, 102, and 103), after a certain period of time R3 elapsed in step 620. The delay times R2 and R3 and the condition for activating the return timer in step 240 will be described later on.

[Initial Value of Ta]

The initial value of the time Ta is held in the controller 3 and the time Ta is initialized by the CPU in the computer system 1 via the system bus 2. It is necessary that the initial value of the time Ta be larger than the repetition period of a small loop program which is the target of detection. With too large an initial value, the loop count, i.e., the number of times that the CPU loops through the steps 101, 102, and 103, increases, resulting in the power saving effect becoming essentially impaired. Hence, the initial value of the time Ta must be set such that the power dissipation is minimized.

[Address Block]

To detect a small loop program with the highest accuracy, it is necessary that the addresses accessed by the CPU and stored in the address memory and comparison circuit 4 have a one-to-one correspondence to addresses of the address memory. In practice, however, it is preferable to store the address information in units of blocks. Taking into account the continuity of addresses which are accessed for the execution of a small loop program to be detected, it is possible, by storing the address information in blocks, to detect the small loop program with high accuracy substantially equal to that obtainable in the case of storing the information for each address.

[Exceptional Conditions]

A small loop program which includes the process for determining if the CPU is waiting for a substantial task to start is the small loop program intended to be detected. Hence the exceptional condition in step 210 is met in the case where the process for determining if the CPU is waiting for a substantial task to start was not performed during the execution of step 200. An exceptional condition is also satisfied in the case where an event impossible to a small loop program, which is the target of detection, occurred during the execution of step 200. Even if such an exceptional condition is met, the small loop program is very likely to be executed thereafter; so that the delay time R1 is provided to prevent repeated detection of the same program.

[Return Signal]

The return signal is a signal for judging that it is decided that the CPU in the substantial rest state would be activated for executing a substantial task. Upon generation of the return signal the detected small loop program will disappear, and consequently, the computer system 1 is required to initiate the execution of the new task. Thus, the event of deciding that the CPU would be activated serves as the return signal.

[Delay Time R2]

Upon generation of the return signal, the CPU proceeds to a process of performing a task corresponding to the return signal from a process of executing a detected small loop program. In this process the CPU is likely to access an address other than the learned addresses in step 200. After this, it is highly probable that the CPU executes again the detected small loop program. To avoid this, the delay time R2 is selected substantially equal to an estimated period of time for the CPU to perform the task corresponding to the return signal.

[Delay Time R3]

When a condition for activating the return timer is met, the possibility exists that the small loop program being detected is not one that the CPU is actually executing. Also when the return timer becomes UP, there is a strong possibility of an error being made in the detection of the small loop program. In this instance, it is very likely that the small loop program detected is executed again, which lessens the power saving effect. To avoid this, the delay time R3 is used which corresponds to an estimated period of time necessary for the small loop program to disappear.

[Condition for Activating Return Timer]

This condition is met when it is detected in step 200 that the CPU has accessed an address other than the learned addresses. The condition is also fulfilled when the CPU was restarted, based on the time-UP operation of the return timer in the previous cycle of operation.

As will be seen from the above, the controller 3 always goes back to step 100 in the case where the result of the check in step 200 is YES or positive, and when the result of the check in step 200 is NO or negative for the first time and no exceptional condition is met, the controller 3 activates the return timer and effects the power-down control, stopping the power supply to the CPU. Thereafter, if the return signal such as an input from the keyboard or the like is not applied until the return timer becomes UP, then the controller 3 effects the restart control. That is, when the return timer becomes UP, the controller 3 exercises the restart control to supply power to the CPU, causing it to resume the task it executed prior to the power-down control. Then the controller 3 returns to step 100. Also in the case where the result of the check in step 200 is negative and no exceptional condition is met, besides no return signal is applied until the return timer becomes UP, the restart control is effected when the return timer becomes UP. Until the return timer becomes UP or return signal is applied, the controller 3 always goes back to step 100 from step 200 as described above, and consequently, the CPU intermittently goes into the power-down mode for a period of time corresponding to the time set for the return timer to become UP.

In the case where the power-down control is effected and the return signal such as an input signal from the keyboard or the like is applied before the return timer becomes UP, the controller 3 immediately performs the restart control processing to cause the CPU to resume processing the task at the point of interruption by the power-down control. In this instance, the controller 3 proceeds to steps in the order of 500, 600, 610 and 200, skipping the cyclic search and address learning steps 100, 101, 102 and 103, and the controller 3 performs processing in step 200, using the predetermined period of time Tc=2×Ta. When the result of the check in step 200 is negative and no exceptional condition is met, the controller 3 effects the power-down control without activating the return timer, because any conditions therefor are not met. In consequence, the restart control is initiated only by the application of the return signal such as an input signal from the keyboard or the like.

While in the above the time Tb is equal to Ta and Tc is twice longer than Ta, the present invention is not limited specifically thereto. The time Tb may be chosen properly larger than Ta and reduced according to Ta or held unchanged. The time Tc varies with Ta and may be chosen larger than Ta by a certain value, for example, 1.5 times larger or 1.5 times plus a certain value; in short, the time Tc is selected such that the small loop program can be detected accurately.

Next, a description will be given of another embodiment of the present invention.

Figure 5:
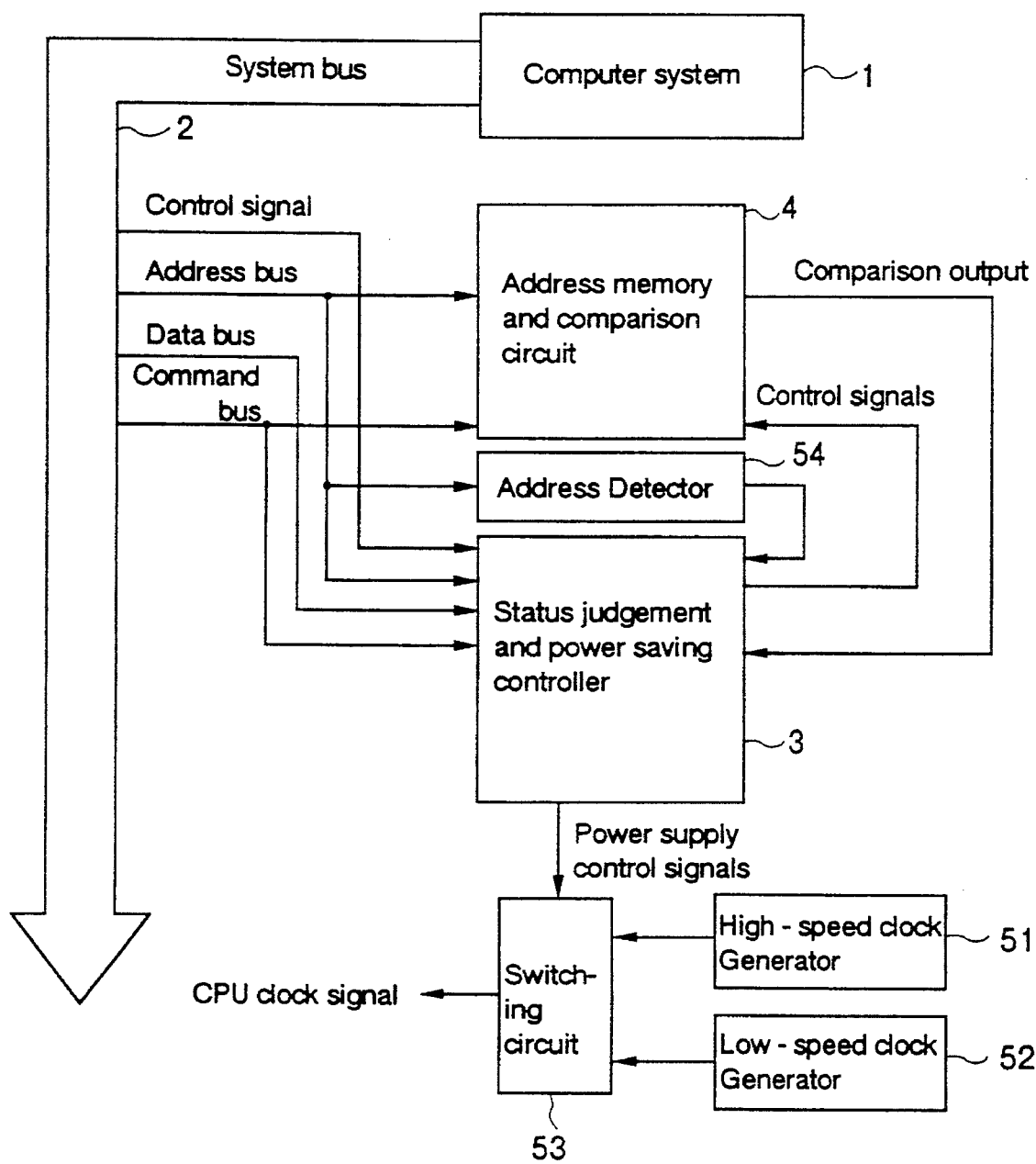
FIG. 5 is a block diagram illustrating the general construction of a computer system equipped with the power saving control unit according to the fifth aspect of the invention which embodies the method according to the second aspect of the invention.

FIG. 5 illustrates in block form the general construction of a computer system equipped with the power saving control unit according to another embodiment of the present invention. The parts corresponding to those in FIG. 1 are identified by the same reference numerals. With the hardware structure of this embodiment, the CPU is switched between the normal mode of ordinary power consumption (a high-speed mode) and the power saving mode of small power consumption (a low-speed mode), by selectively changing the frequency of a CPU clock signal which is applied to the CPU in the computer system 1. A high-speed clock generator 51 generates a clock signal of 50 MHz, for instance, whereas a low-speed clock generator 52 generates a clock signal of 4 MHz, for example. Either one of the two clock signals is selected by a switching circuit 53 for supply to the CPU. The switching circuit 53 is placed under control of the controller 3.

In this embodiment there is provided an address detector 54 which supervises signals on the system bus 2 and notifies the controller 3 of an access of the CPU to a specific address. In the case of the computer system 1 provided with MS-DOS now widely used, an interrupt vector table is assigned to a specific address, no matter what application program, which is run in a real mode of the CPU, may be run. In the interrupt vector table there is set a keyboard sensing software interrupt function. Hence, an operator's manipulation of the keyboard can quickly be detected by employing arrangement in which the address detector 54 detects an access to the specific address in the interrupt vector table. The resulting address detected signal is used for power consumption control as described below.

Figure 6:
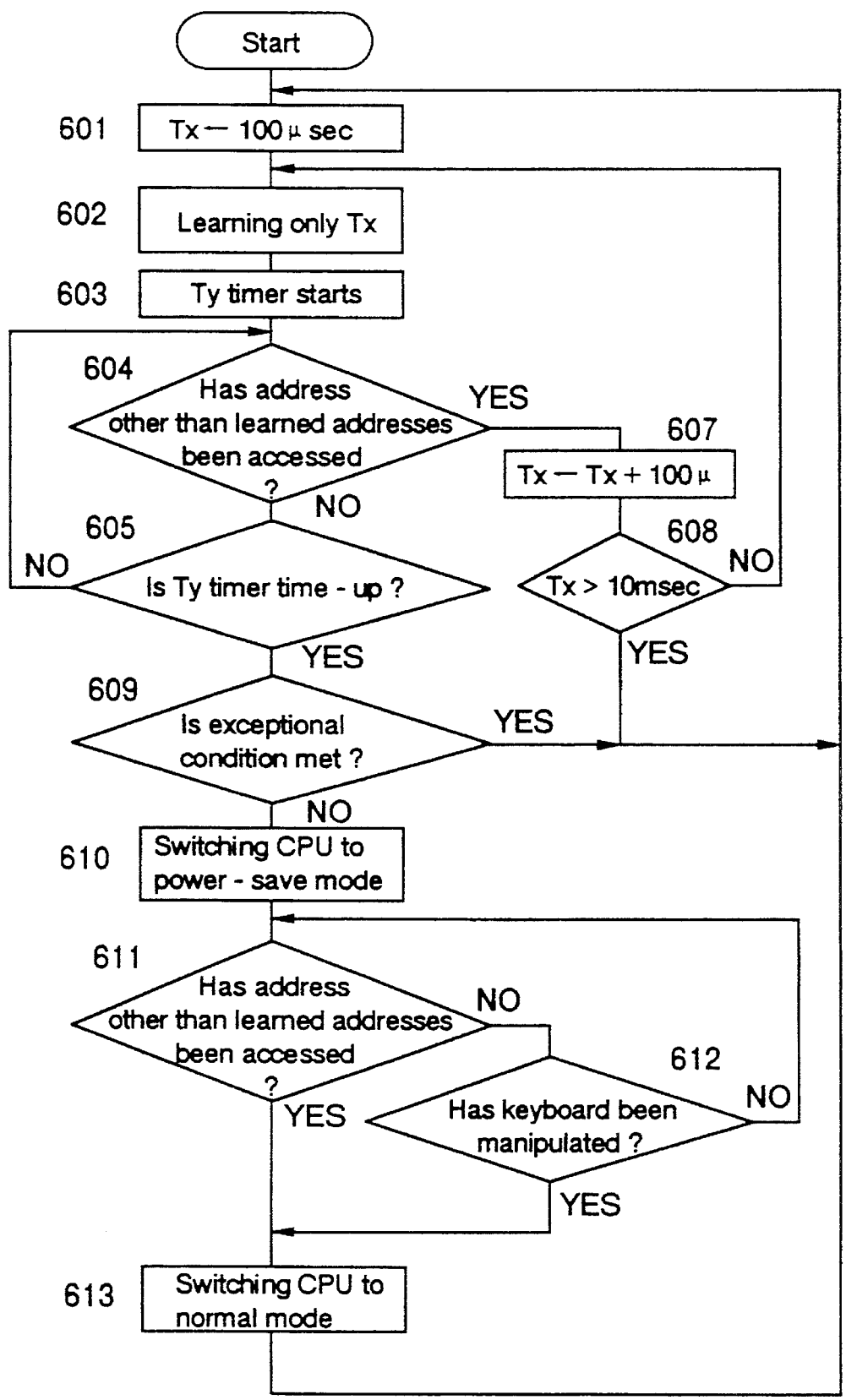
FIG. 6 is a flowchart showing the procedure of the status judgement and power saving controller 3 in FIG. 5.

FIG. 6 is a flowchart showing a principal control procedure in the FIG. 5 embodiment.

In step 601 a learning time Tx is set to a lower limit value 100 μsec. In the next step 602 the address memory and comparison circuit 4 is cleared and is then caused to operate in the address store mode for only the learning time Tx. By this, address blocks accessed by the CPU during the period Tx are stored in the address memory and comparison circuit 4 (the stored address blocks being the learned addresses).

In step 603 a timer, provided for measuring an elapsed time Ty (=2.5×Tx) which is set according to the learning time Tx, is started and the address memory and comparison circuit 4 caused to operate in the address comparison mode. Then a check is made to see if the CPU accesses an address other than the learned addresses during the period Ty (steps 604 and 605). If a new address is accessed by the CPU within the time Ty, the process proceeds from step 604 to 607, wherein a new learning time Tx is set by adding 100 μsec to the previous learning time Tx, and in step 608 it is checked whether the time Tx exceeds an upper limit value 10 msec. If the time Tx does not exceed the upper limit value, then the process returns to step 602 to perform the learning. If the time Tx is longer than 10 msec, then the process goes back to step 601, to set the learning time Tx to the lower limit value 100 μsec, after which the process proceeds to step 602.

In steps 601 through 608 mentioned above, the controller 3 repeatedly performs the learning process in step 602 and the supervising process in steps 603, 604 and 605 while gradually increasing the learning time Tx and the supervising time Ty from their lower limit values toward upper limit values. By this, the smallest possible value Tx(min) of the time Tx in which is introduced a state wherein any address other than the learned addresses is not accessed during the time Ty is detected with a resolution of 100 μsec.

When the above-mentioned state is detected, the process proceeds from step 605 to 609, wherein it is checked whether or not a separately set exceptional condition is met. If the exceptional condition is met, then the process goes back to step 601, but it not, the process proceeds to step 610, wherein the controller 3 switches the switching circuit 53 to apply therethrough the 4 MHz clock signal from the low-speed clock generator 52 to the CPU, putting it in the power saving mode.

During the operation in the power saving mode it is checked whether the CPU accesses any other address than the learned addresses (step 611) and it is checked by the address detector 54 whether the keyboard is manipulated or not (step 612). When an address other than the learned addresses is accessed, or when the keyboard is manipulated, the process goes to step 613, wherein the controller 3 switches the switching circuit 53 to apply therethrough the 50 MHz clock signal from the high-speed clock generator 51 to the CPU, alternating it to the normal mode. Even if step 612 is omitted, a new input signal from the keyboard can be used to branch out of the loop to provide the state wherein an address other than the learned addresses is accessed by the CPU, but the inclusion of step 612 helps the CPU return to the normal mode more rapidly.

In the FIG. 6 embodiment the value Tx(min) is detected while gradually increasing the value Ty, whereas in the embodiment described previously with respect to FIGS. 2 to 4 the value Tx(min) is detected while gradually decreasing the values Tx and Ty. The former is superior to the latter from the viewpoint of detecting the value Tx(min) in the shortest possible time. It is also possible to detect the value Tx(min) by repeating the learning and the supervision while varying the values Tx and Ty at random according to a predetermined algorithm.

In the embodiments described above, learning and supervision are repeated while changing the values Tx and Ty and the minimum value Tx(min) of the time Tx in which occurs the state wherein an address other than the learned addresses is not accessed during the period Ty is detected with a proper algorithm.

Figure 7:
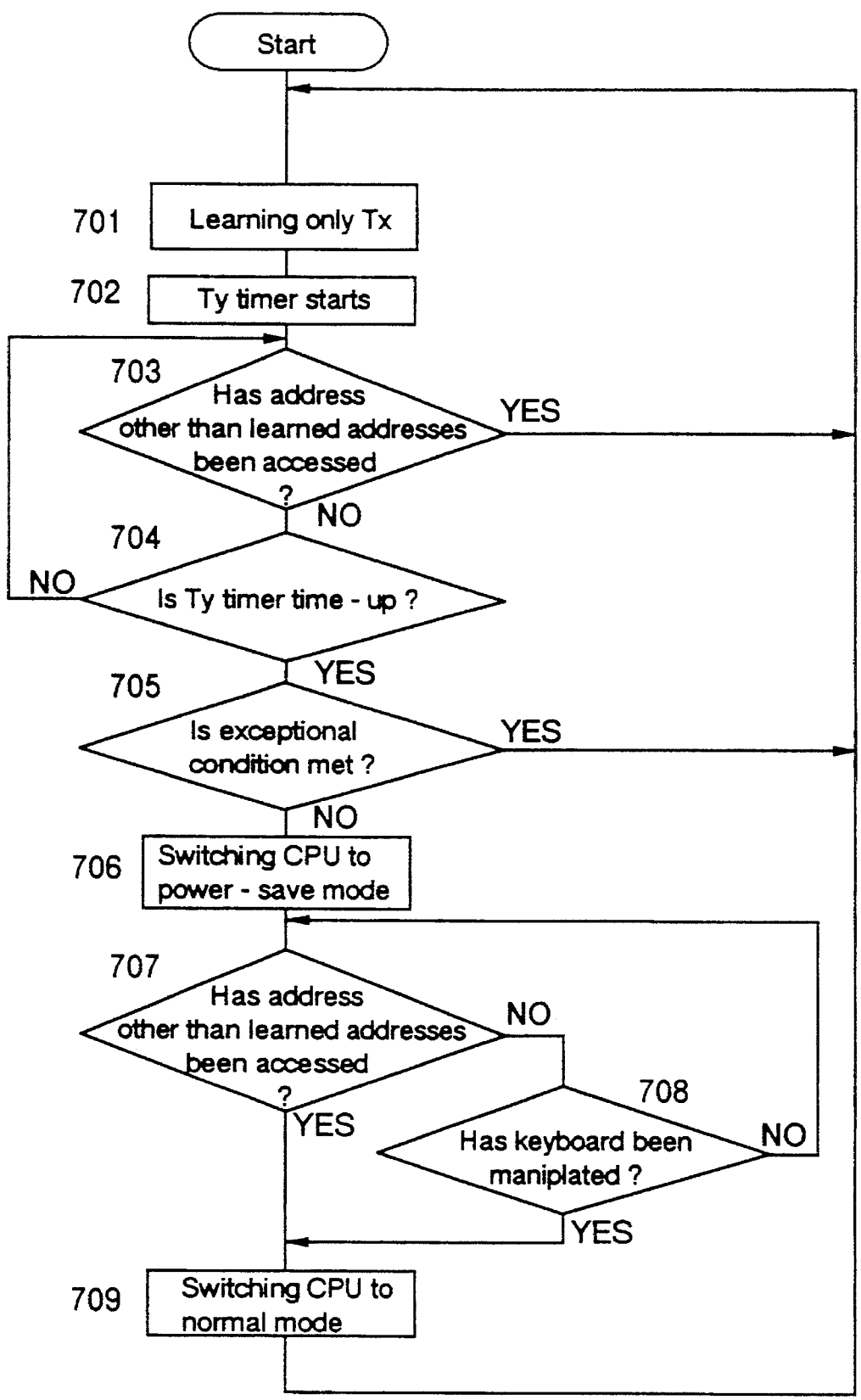
FIG. 7 is a flowchart showing the procedure of the power saving control unit according to the sixth aspect of the invention which embodies the method according to the fourth aspect of the invention.

FIG. 7 is a flowchart showing the control procedure in another embodiment of the present invention, in which the learning time Tx and the supervising time Ty (=2×Tx±α) are both fixed to properly selected relatively small values, respectively. As shown in FIG. 7, when the state wherein no address other than the learned addresses is accessed within the time Ty after the learning for the time Tx (assuming that no other exceptional condition is met), it is decided that the CPU is in the substantial rest state and then it is put in the power saving mode (i.e., the low-speed clock mode). With such simple control, too, it is possible to reduce power consumption appreciably without impairing the throughput of the computer system 1, as long as the value of the time Tx is appropriate.

Although in the above the control system of operating the CPU intermittently at proper time intervals and the control system of switching the CPU clock signal to a low speed are described to be used for causing the CPU to operate in the small power consumption mode, it is also possible to employ a method of reducing the power supply voltage or reducing the address access rate of the CPU.

Figure 8:
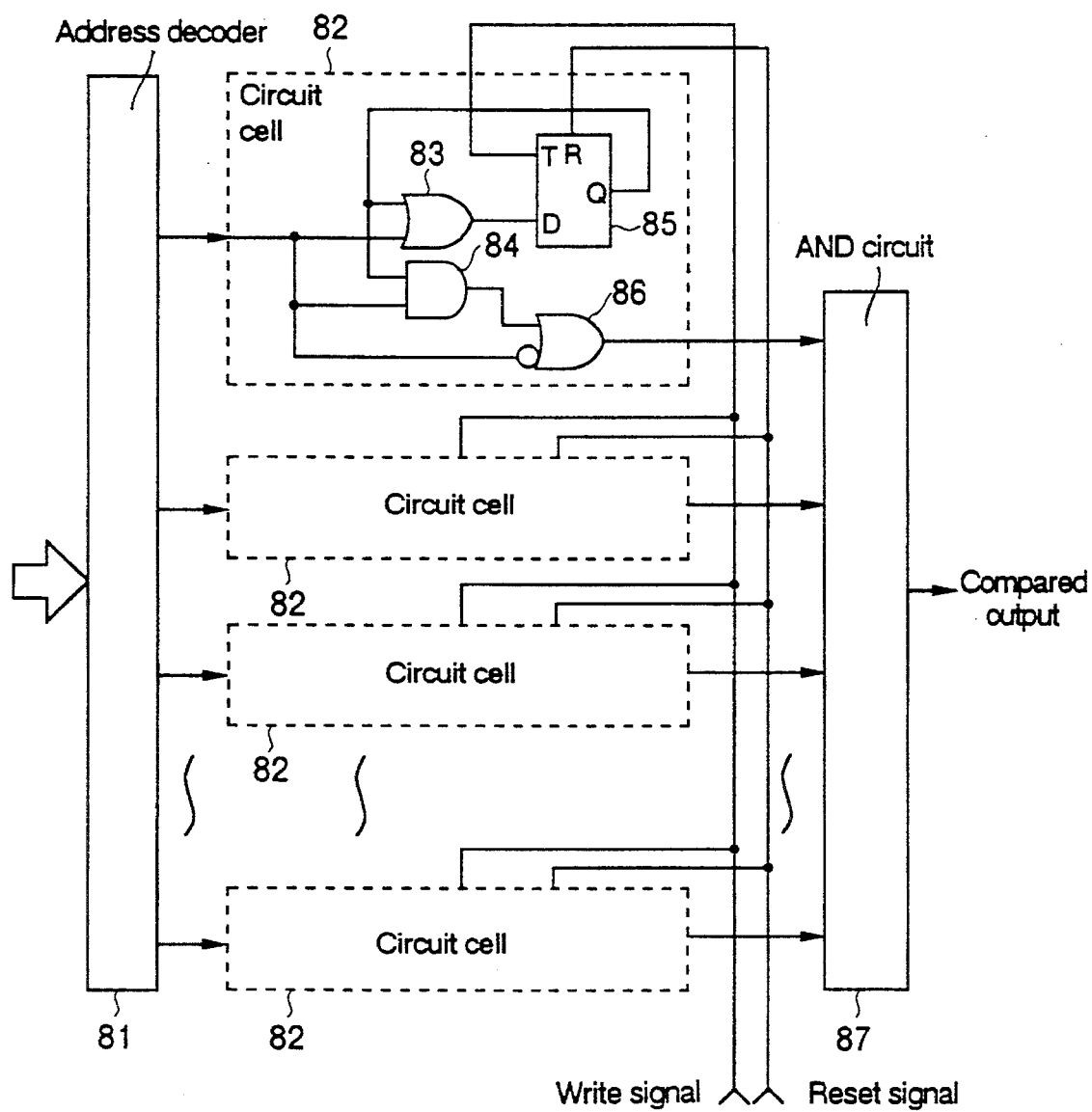
FIG. 8 is a circuit diagram illustrating a specific operative example of an address memory and comparison circuit.

FIG. 8 illustrates in block form a specific operative example of the address memory and comparison circuit 4. In FIG. 8 an address signal from the CPU is decoded by an address decoder 81 and only one of its plural outputs goes to "1." The outputs of the address decoder 81 are connected to circuit cells 82 with each having the same construction.

In the circuit cell 82, when the input thereto from the address decoder 81 goes to "1" the output of an OR gate 83 also goes to "1." If now the circuit 4 is in the address store mode described previously, the output "1" of the OR gate 83 is stored in a flip-flop 85 in synchronization with a write signal from the controller 3. In the other circuit cells 82 wherein the input from the address decoder 81 is "0" the flip-flop 85 stores "0" (i.e., the flip-flop is held reset).

When the circuit 4 leaves the address store mode and enters the address comparison mode, no write signal is applied and the content of each flip-flop 85 remains unchanged. In one circuit cell 82 to which the output "1" of the address decoder 81 is applied, if the output of the flip-flop 85 is "1," the output of an AND gate goes to "1" and consequently the output of an OR gate 86 goes to "1." If the output of the flip-flop 85 is "0" in this circuit cell 82, then the output of the OR gate 86 is "0." On the other hand, in the other circuit, cells 82 to which the outputs "0" are provided from the address decoder 81, the output of the OR gate 86 goes to "1." The outputs of the OR gates 86 of all the circuit cells 82 are subjected to AND operation by an AND circuit 87 and its output is provided as a compared output to the controller 3.

That is, plurality of "1" signals are stored in the flip-flops 85 of some of the circuit cells 82 in the time Tx during which the circuit 4 is in the address store mode. In the address comparison mode, if no address other than the learned addresses is accessed, the output of the AND circuit 87 remains at "1" but it goes to "0" when an address other than the learned addresses is accessed.

Incidentally, the address memory and comparison circuit 4 is not limited specifically to the above-described construction but may also employ, for example, an arrangement in which a RAM is provided for writing "1" at an address accessed by the CPU in the address store mode and when the RAM outputs "0" in the address comparison mode, it is decided that an address other than the learned addresses has been accessed by the CPU.

With the supervisory control method according to the present invention, it is possible to detect, with an appreciably high degree of accuracy, the strong possibility that the CPU is in the substantial rest state wherein it is waiting for a substantial task to start while executing a small loop program repeatedly when the computer system is executing non-specific software. Besides, the present invention does not call for introducing any particular modifications in software for use in the computer system nor does it require pre-analyzing such software.

By detecting the substantial rest state of the CPU and effecting its power-down control through use of the method according to the present invention, power consumption can also be reduced in the substantial rest state of the CPU for only several milliseconds to several seconds. Thus, the method of the present invention affords substantial reduction of the power consumption of the CPU as compared with the conventional power-down control method.

While the supervisory control method according to the present invention has been described to be applied to the power-down control, it can also be used for other purposes.

It will be apparent that many modifications and variations may be effected without departing from the scope of the novel concepts of the present invention.

What is claimed is:

1. A power saving control unit for a computer system, comprising:

means A for switching an operation mode of a CPU of said computer system between a normal mode of ordinary power consumption and a power saving mode of small power consumption;

means B whereby addresses accessed by said CPU in a predetermined period of time Tx are stored in an address memory, said stored addresses being defined as learned addresses;

means C for checking immediately after the operation of said means B whether or not said CPU accesses an address other than said learned addresses in a predetermined period of time Ty dependent on said period of time Tx;

means D for causing said means B and C repeatedly perform their operation while properly varying said times Tx and Ty in the state wherein said CPU is in said normal mode of operation and a minimum value Tx(min) of said time Tx in which occurs a state wherein no address other than said learned addresses is accessed by said CPU is detected using an algorithm;

means E for causing said CPU to operate in said power saving mode unless the condition is met when said minimum value Tx(min) is detected by said means D;

means F for detecting an access of said CPU to an address other than said learned addresses when said CPU is in said power saving mode; and means G for putting said CPU in said normal mode when an access of said CPU to an address other than said learned addresses is detected by said means F.

2. The power saving control unit for a computer system as claimed in claim 1, wherein said means A is a switching circuit for switching a clock signal supplied for said CPU between a high-speed clock generator for the normal mode and a low-speed clock generator for the power saving mode.

3. A power saving control unit for a computer system, comprising:

means a for switching a CPU of said computer system between a normal mode of ordinary power consumption and a power saving mode of small power consumption;

means B whereby addresses accessed by said CPU in a predetermined period of time Tx are stored in an address memory, said stored addresses being defined as learned addresses;

means C for checking immediately after the operation of said means B whether or not said CPU accesses an address other than said learned addresses in a predetermined period of time Ty related to said period of time Tx;

means D for causing said means B and C to repeatedly perform their operation in the state wherein said CPU is in said normal mode of operation and said CPU is put in said power saving mode, if the condition is not met when no access of said CPU to an address other than said learned addresses is detected in said time Ty;

means E for detecting an access of said CPU to an address other than said learned addresses when said CPU is in said power saving mode of operation; and means F for putting said CPU in said normal mode of operation when an access of said CPU to an address other than said learned addresses is detected by said means E.

4. A power saving control unit for a computer system including a CPU and a system bus, comprising:

switching circuit for switching said CPU of said computer system between a normal mode of ordinary power consumption and a power saving mode of small power consumption;

address memory and comparison circuit for storing addresses accessed by said CPU in a predetermined period of time in said address memory, and for checking whether or not said CPU accesses an address other than said stored addresses in another predetermined time;

address detector for detecting an access of said CPU to an address other than said stored addresses when said CPU is in said power saving mode of operation;

status judgement and power saving controller for supervising signals on said system bus and for putting said CPU in said normal mode of operation when an access of said CPU to an address other than said stored addresses is detected by said address memory and comparison circuit, whereby said address memory and comparison circuit and said address detector repeatedly perform their operation in the state wherein said CPU is in said normal mode of operation and said CPU is put in said power saving mode if the condition is not met when no access of a said CPU to an address other than said stored addresses is detected in said another predetermined period of time;

high-speed clock generator for supplying a clock signal of higher frequency to said CPU through said switching circuit for the normal mode; and low-speed clock generator for supplying a clock signal of lower frequency to said CPU through said switching circuit for the power saving mode.

* * * * *